United States Patent
Li et al.

(10) Patent No.: US 12,361,622 B2
(45) Date of Patent: Jul. 15, 2025

(54) SKILL CASTING METHOD AND APPARATUS OF VIRTUAL OBJECT, DEVICE, AND STORAGE MEDIUM

(71) Applicant: TENCENT TECHNOLOGY (SHENZHEN) COMPANY LIMITED, Shenzhen (CN)

(72) Inventors: Wei Li, Shenzhen (CN); Yuning Yang, Shenzhen (CN); Hang Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 344 days.

(21) Appl. No.: 17/975,311

(22) Filed: Oct. 27, 2022

(65) Prior Publication Data
US 2023/0043121 A1 Feb. 9, 2023

Related U.S. Application Data

(63) Continuation of application No. PCT/CN2022/079017, filed on Mar. 3, 2022.

(30) Foreign Application Priority Data

Mar. 4, 2021 (CN) .......................... 202110239240.7

(51) Int. Cl.
*G06T 13/40* (2011.01)
*A63F 13/58* (2014.01)
(Continued)

(52) U.S. Cl.
CPC .............. *G06T 13/40* (2013.01); *A63F 13/58* (2014.09); *G06T 7/70* (2017.01); *G06T 17/00* (2013.01);
(Continued)

(58) Field of Classification Search
None
See application file for complete search history.

(56) References Cited

U.S. PATENT DOCUMENTS

2005/0187015 A1  8/2005 Suzuki et al.
2010/0069152 A1* 3/2010 Nishimura ............ A63F 13/525
                                                              463/31
(Continued)

FOREIGN PATENT DOCUMENTS

CN    111672116 A    9/2020
CN    111672127 A    9/2020
(Continued)

OTHER PUBLICATIONS

The World Intellectual Property Organization (WIPO) International Search Report for PCT/CN2022/079017 Jun. 8, 2022 7 Pages (including translation).

*Primary Examiner* — Kent W Chang
*Assistant Examiner* — Jonathan M Cofino
(74) *Attorney, Agent, or Firm* — ANOVA LAW GROUP PLLC

(57) ABSTRACT

A skill casting method includes displaying a first virtual object in a virtual environment, the virtual environment further comprising a second virtual object, the first virtual object facing a first direction, and the second virtual object being located at a second direction of the first virtual object. The skill casting method also includes: displaying a casting preparation process of the first virtual object casting a target skill when the target skill is triggered on the first virtual object; and controlling the first virtual object to cast the target skill toward the second direction when the casting preparation process ends.

16 Claims, 10 Drawing Sheets

(51) Int. Cl.
G06T 7/70 (2017.01)
G06T 17/00 (2006.01)
G06T 19/20 (2011.01)

(52) U.S. Cl.
CPC ...... G06T 19/20 (2013.01); *G06T 2219/2016* (2013.01)

(56) References Cited

U.S. PATENT DOCUMENTS

| | | |
|---|---|---|
| 2010/0245233 A1 | 9/2010 | Hammarling et al. |
| 2010/0273544 A1 | 10/2010 | Koganezawa et al. |
| 2013/0288794 A1* | 10/2013 | Ando .................... A63F 13/833 463/31 |
| 2014/0274379 A1* | 9/2014 | Justice .................... A63F 13/12 463/31 |
| 2015/0276349 A1* | 10/2015 | Northrup .................. F41G 3/26 434/22 |
| 2016/0158641 A1* | 6/2016 | Summons ............. A63F 13/219 463/31 |
| 2022/0040578 A1 | 2/2022 | Hu et al. |
| 2022/0040580 A1 | 2/2022 | Wan et al. |

FOREIGN PATENT DOCUMENTS

| | | |
|---|---|---|
| CN | 112402949 A | 2/2021 |
| CN | 112843679 A | 5/2021 |

\* cited by examiner

SKILL CASTING METHOD AND APPARATUS OF VIRTUAL OBJECT, DEVICE, AND STORAGE MEDIUM

RELATED APPLICATIONS

This application is a continuation of PCT Application No. PCT/CN2022/079017, filed on Mar. 3, 2022, which in turn claims priority to Chinese Patent Application No. 202110239240.7, entitled "SKILL CASTING METHOD AND APPARATUS OF VIRTUAL OBJECT, DEVICE, AND MEDIUM", and filed on Mar. 4, 2021. The two applications are both incorporated herein by reference in their entirety.

FIELD OF THE TECHNOLOGY

This application relates to the field of virtual environment, and in particular, to a skill casting method and apparatus of a virtual object, a device, and a storage medium.

BACKGROUND OF THE DISCLOSURE

In massive multiplayer online role-playing games (MMORPG), there are virtual objects with large models, high hit points, and exclusive skills, such as bosses (boss-level guard monsters) in instance dungeons.

The model of this type of virtual objects is larger than the model of player characters in volume, and there usually is certain foreswing when certain skills are cast by the virtual object toward a player character. If the virtual player character moves notably during the foreswing period, the virtual object and its skills cannot face the virtual player object properly, causing visual discontinuity or unrealistic feeling.

SUMMARY

Embodiments of this application provide a skill casting method and apparatus of a virtual object, a device, and a storage medium. The technical solutions are as follows.

One aspect of the present disclosure provides a skill casting method of a virtual object. The method includes displaying a first virtual object in a virtual environment, the virtual environment further comprising a second virtual object, the first virtual object facing a first direction, and the second virtual object being located at a second direction of the first virtual object; displaying a casting preparation process of the first virtual object casting a target skill when the target skill is triggered on the first virtual object; and controlling the first virtual object to cast the target skill toward the second direction when the casting preparation process ends.

Another aspect of the present disclosure provides a terminal, including a processor and a memory, the memory storing at least one instruction, at least one program, a code set, or an instruction set, the at least one instruction, the at least one program, the code set, or the instruction set being loaded and executed by the processor to implement the skill casting method of the virtual object in the embodiments of this application.

Another aspect of the present disclosure provides a computer-readable storage medium, storing at least one program code, the at least one program code being loaded and executed by a processor to implement the skill casting method of the virtual object in the embodiments of this application.

In a virtual environment including a first virtual object and a second virtual object, when the first virtual object uses a target skill, a casting preparation process is displayed. The casting preparation process includes a posture change process and an orientation change process that are simultaneously displayed. The posture change process includes a posture performance change of the first virtual object at a casting preparation stage of the target skill. The orientation change process includes an orientation change with a first direction as an initial orientation and a second direction as a target orientation. After the casting preparation process ends, the first virtual object is controlled to cast the target skill toward the second direction.

In the process of triggering a virtual object to cast a target skill until the target skill is cast, a posture change and an orientation change are synchronized to display a casting preparation process. The synchronous display of the posture change and the orientation change improves how realistic the picture performance is when the virtual object casts the skill, improves the display effect of skill casting, reduces the picture freeze caused by the switch between the orientation change and the posture change, and improves the fluency of picture display.

DESCRIPTION OF EMBODIMENTS

Figure 1:
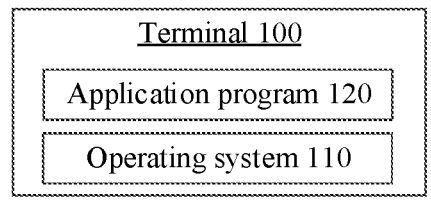
FIG. 1 is a structural block diagram of a terminal according to one embodiment of this application.

First, terms involved in the embodiments of this application are briefly introduced.

Virtual environment: a virtual environment displayed (or provided) by an application program when running on a terminal. The virtual environment may be a simulated environment of the real world, or may be a semi-simulated semi-fictional three-dimensional environment, or may be an entirely fictional three-dimensional environment. The virtual environment may be any one of a two-dimensional virtual environment, a 2.5-dimensional virtual environment, and a three-dimensional virtual environment.

Virtual object: a movable object in a virtual environment. The movable object may be a virtual character, a virtual animal, a cartoon character, or the like, such as a character, an animal, a plant, an oil drum, a wall, or a stone displayed in a three-dimensional virtual environment. In some embodiments, the virtual object is a three-dimensional model created based on a skeletal animation technology. Each virtual object has a shape and size in the three-dimensional virtual environment, and occupies some space in the three-dimensional virtual environment. In the embodiments of this application, the virtual object includes a player character type and a non-player character (NPC) type. A virtual object of the player character type is a virtual object that allows to be manipulated by a real player in a virtual environment. The player controls the virtual object in the virtual environment to perform activities. The activities include, but are not limited to at least one of adjusting body postures, crawling, walking, running, riding, jumping, driving, picking, attacking, and using a skill. A virtual object of the NPC type is a virtual object that is not manipulated by a real player in a virtual environment. Generally, the NPC is controlled by the artificial intelligence of a computer and is a character with its own behavior mode. A player may manipulate a virtual object of the player character type to interact or fight with a virtual object of the NPC type. For example, NPCs include plot NPCs and functional NPCs. The plot NPCs are an essential part of a game for promoting the development of the plot of the game. The functional NPCs include service NPCs and combatable NPCs. The service NPCs are NPCs that provide various services to the player character in the game. The services include a transaction service, a skill service, and the like. The combatable NPCs are NPCs that can fight with the player character in the game. In some examples, one NPC can have the characteristics of both NPC types, that is, the NPC is both a plot NPC and a functional NPC.

Skill: The skills in embodiments of this application refer to the capabilities cast by a virtual object for modifying an attribute value of the virtual object itself, affecting an attribute value of another virtual object, or affecting attribute values of the virtual object itself and other virtual objects at the same time. The virtual object may be a virtual object of the player character type or may be a virtual object of the NPC type. The virtual object has at least one skill. In some embodiments, different virtual objects correspond to different skills. A skill of the virtual object may be acquired or upgraded in a level-up process. In some embodiments, the virtual object may acquire a skill of another virtual object.

In some embodiments, according to skill effects, the skills may be divided into: a damage skill (for reducing the hit point of a virtual object), a shielding skill (for adding shields to a virtual object), an acceleration skill (for increasing the movement speed of a virtual object), a deceleration skill (for decreasing the movement speed of a virtual object), an imprisonment skill (for restricting the movement of a virtual object for a certain period of time), a forced displacement skill (for forcing a virtual object to move), a silence skill (for displaying the skill casting of a virtual object for a certain period of time), a recovery skill (for recovering the health or energy of a virtual object), a vision skill (for acquiring/blocking the vision of a certain range or other virtual characters), a passive skill (that can be triggered when performing a normal attack), and the like. This is not limited in this embodiment.

In some embodiments, according to skill casting methods, the skills may be divided into a targeted skill and a non-targeted skill. The targeted skill is a skill that specifies a skill receiver. That is, after a skill casting target is specified by using the targeted skill, the skill casting target is inevitably affected by the skill. The non-targeted skill is a skill that is cast to a specified direction, range, or region, and the virtual objects in this direction, range, or region are affected by the skill.

Casting preparation process: The process of casting a skill includes a casting preparation process and a skill effective process. The casting preparation process is a process from a moment a virtual object is triggered to cast a target skill until the target skill takes effect. The skill effective process is a process in which the target skill takes effect after the casting preparation process of the skill ends. For example, virtual damage and/or control effects are inflicted on a virtual object within a preset position range. In the casting preparation process, the posture and/or orientation of the virtual object will change. The casting preparation process of the skill is also referred to as a skill foreswing stage.

With reference to the foregoing terms, the structure of a terminal in the embodiments of this application is described. FIG. 1 is a structural block diagram of a terminal according to one embodiment of this application. A terminal 100 includes: an operating system 110 and an application program 120.

The terminal 100 in this application may be a desktop computer, a portable laptop computer, a mobile phone, a tablet computer, an ebook reader, a Moving Picture Experts Group Audio Layer III (MP3) player, a Moving Picture Experts Group Audio Layer IV (MP4) player, or the like.

The operating system 110 is basic software provided for the application program 120 to perform secure access to computer hardware.

The application program 120 supporting a virtual environment is installed and run on the terminal 100, such as an application program supporting a three-dimensional virtual environment. The application program 120 may be any one of a virtual reality application program, a three-dimensional map program, a third-personal shooting (TPS) game, a first-person shooting (FPS) game, a multiplayer online battle arena (MOBA) game, and a role-playing game (RPG). In this embodiment, the application program 120 is an application program corresponding to an RPG. For example, the RPG may be a shooting game, a fighting game, an adventure game, an action game, or the like. This is not limited herein. In some embodiments, the application program 120 may be a standalone application program such as a standalone RPG program, or may be a network online application program such as MMORPG. A user uses the terminal 100 to control a virtual object located in a virtual environment to perform activities. The activities include, but are not limited to at least one of adjusting body postures, crawling, walking, running, riding, jumping, driving, using a skill, and attacking. For example, the virtual object may be a simulated character role or a cartoon character role.

With reference to the terms and terminal structure above, application scenarios of the embodiments of this application are described.

Figure 2:
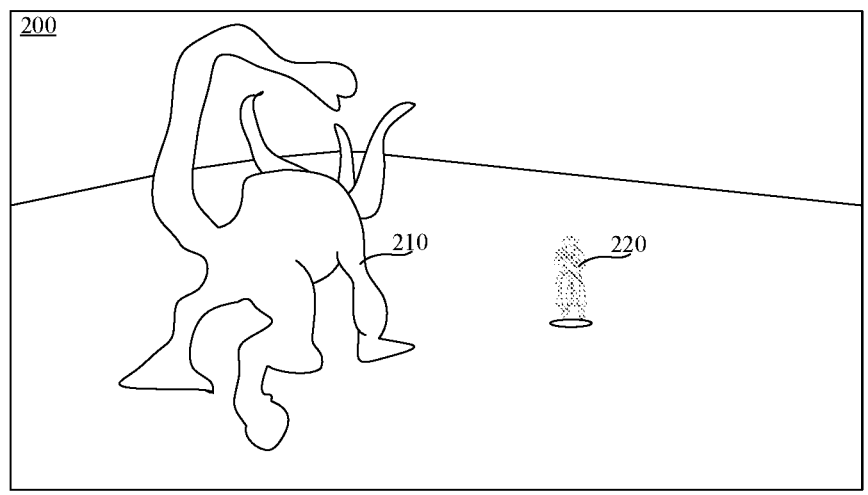
FIG. 2 is a schematic diagram of a virtual environment picture according to one embodiment of this application.

In this embodiment, an example in which the application program in the terminal is an RPG application program is used for description. In the RPG, a user may manipulate a virtual object of the player character type to perform activities in a virtual environment. The virtual environment also includes a virtual object of the combatable NPC type. An example in which the virtual object of the combatable NPC type is BOSS (a boss-level guard monster) is used for description. Generally, a model of BOSS has a larger size than a model of the virtual object of the player character type. As shown in FIG. 2, a first virtual object 210 and a second virtual object 220 are displayed in a virtual environment picture 200. The first virtual object 210 is a boss monster virtual object in a virtual scene corresponding to the current virtual environment, and the second virtual object 220 is a player character virtual object. In this virtual scene, when satisfying a skill triggering condition, the first virtual object 210 attacks the second virtual object 220 by using a skill. For example, after the second virtual object 220 enters a preset region around the first virtual object 210, the first virtual object 210 is triggered to be in a combat state, and in the combat state, the first virtual object 210 attacks the second virtual object 220 as a hatred target. For example, the attack includes a normal attack and a skill attack. When the first virtual object 210 satisfies a skill triggering condition, the first virtual object 210 uses a skill to attack the second virtual object 220, otherwise it uses a normal attack to attack the second virtual object 220.

Compared with the normal attack, the skill attack has a longer foreswing and a higher virtual damage or functional effect. For example, when the first virtual object uses a skill to attack, there is a need to display a skill casting action for a certain period of time, that is, there is a skill casting preparation process. In this embodiment, a posture change process and an orientation change process of the first virtual object are displayed simultaneously in the casting preparation process. The orientation change process includes adjustment of the orientation of the first virtual object with a direction the first virtual object is facing as an initial orientation and a direction corresponding to a position of the second virtual object as a target orientation. After the casting preparation process ends, the first virtual object casts the skill. That is, the foreswing process of skill casting of the first virtual object is displayed through the synchronous display of posture change and orientation change, which has a better corresponding skill casting display effect.

Figure 3:
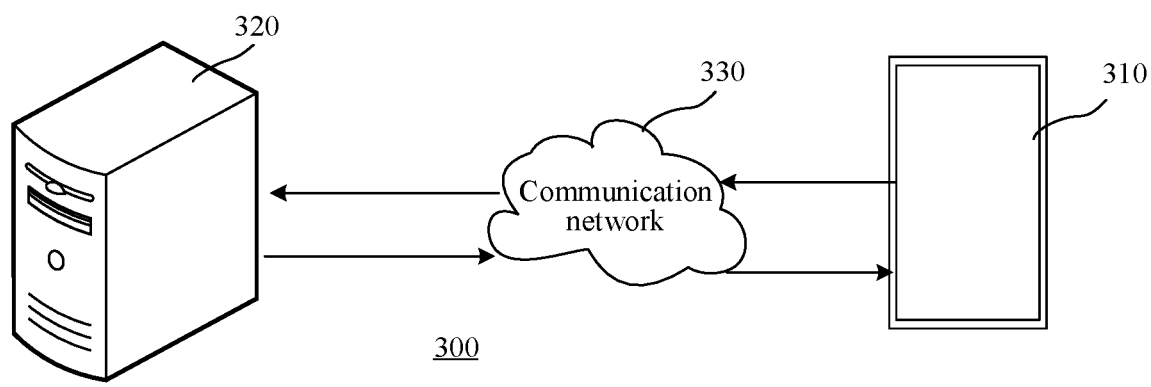
FIG. 3 is a structural block diagram of a computer system according to one embodiment of this application.

FIG. 3 is a structural block diagram of a computer system according to one embodiment of this application. The computer system 300 includes: a terminal 310, a server 320, and a communication network 330.

The terminal 310 may be a desktop computer, a portable laptop computer, a mobile phone, a tablet computer, an ebook reader, an MP3 player, an MP4 player, or the like. An application program supporting a virtual environment is installed and run on the terminal 310, such as an application program supporting a three-dimensional virtual environment. The application program may be any one of a virtual reality application program, a three-dimensional map application, a TPS game, an FPS game, a MOBA game, and an RPG game. In this embodiment, the application program may be an RPG game. In some embodiments, the application program may be a standalone application program, or may be a network online application program.

The server 320 includes at least one of one server, a plurality of servers, a cloud computing platform, and a virtualization center. The server 320 is configured to provide a backend service for an application program supporting a three-dimensional virtual environment. In some embodiments, the server 320 is in charge of primary computing, and the terminal 310 is in charge of secondary computing. Alternatively, the server 320 is in charge of secondary computing, and the terminal 310 is in charge of primary computing. Alternatively, the server 320 and the terminal 310 perform collaborative computing based on a distributed computing architecture.

A user may control a virtual object in an application program supporting a virtual environment through the terminal 310. For example, the application program is a 3D MMORPG program, that is, a user may control a virtual object to interact or fight with an NPC virtual object in a virtual environment. When a user controls a virtual object to perform an operation, the terminal generates a corresponding operation request and transmits the request to the server 320 for authentication. If the operation request is valid, corresponding logic processing is performed, and a processing result is returned to the terminal 310. The terminal 310 displays a corresponding virtual scene picture.

A person skilled in the art may learn that there may be more terminals 310. For example, there may be only one terminal 310, or there may be dozens of or hundreds of terminals 310 or more. The quantity and type of the terminal 310 are not limited in this embodiment.

Figure 4:
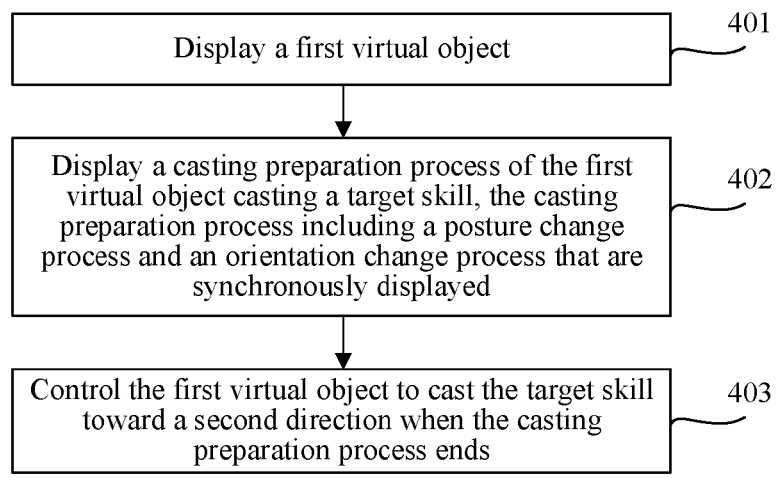
FIG. 4 is a flowchart of a skill casting method of a virtual object according to one embodiment of this application.

FIG. 4 shows a skill casting method of a virtual object according to one embodiment of this application. Description is made in this embodiment by using an example in which the method is applied to a terminal. The method includes the following steps.

Step 401. Display a first virtual object.

In this embodiment, an example in which an MMORPG application program runs in the terminal is used for description. A virtual environment interface corresponding to MMORPG is displayed on the terminal. The virtual environment interface includes a virtual environment picture. A first virtual object and a second virtual object are displayed in the virtual environment picture. The first virtual object is a virtual object of the NPC type, and the second virtual object is a virtual object of the player character type. The virtual environment interface is an interface obtained by superimposing interface elements such as instruments and controls on the virtual environment picture. The first virtual object and the second virtual object are in the virtual environment.

The virtual environment picture is a picture captured by a camera model in the three-dimensional virtual environment. That is, the virtual environment interface includes the virtual environment picture. For example, the virtual environment picture displayed on the terminal may be a picture displayed from a first-person perspective of the second virtual object, or may be a picture displayed from a third-person perspective of the second virtual object. The first-person perspective is a perspective corresponding to a picture that can be observed by the virtual object in the virtual environment. The picture corresponding to the first-person perspective does not include the second virtual object itself, for example, only an arm and a virtual prop held by the second virtual object can be seen. The third-person perspective is a perspective used by a camera model for observing the second virtual object in the virtual environment. The picture corresponding to the third-person perspective includes the second virtual object itself, and generally the camera model is located behind the second virtual object to observe the virtual object.

For example, the first virtual object may be a virtual object of the NPC type located at a fixed position/random position in the virtual environment, and its corresponding model is always displayed in the virtual environment or is automatically refreshed in the virtual environment with time; or may be a virtual object of the NPC type displayed in the virtual environment after the second virtual object satisfies a preset trigger condition. For example, when the second virtual object satisfies a preset trigger condition, the first virtual object is displayed in the virtual environment. The preset trigger condition includes, but is not limited to, at least one of a task selection condition, an object order display condition, and a position condition. The task selection condition indicates that a task selected by the second virtual object corresponds to the first virtual object. For example, the second virtual object receives a first task from other NPC virtual objects, and the first virtual object is displayed in response to successfully receiving the first task, or the first virtual object is displayed in response to successfully completing the first task. The object order display condition indicates that the virtual environment includes n first virtual objects, and when a $k^{th}$ first virtual object is displayed, the second virtual object completes virtual battles with previous (k−1) first virtual objects, n being a positive integer, and 1<k≤n. For example, there are a plurality of BOSS virtual objects corresponding to an instance dungeon, and the first virtual object as a second BOSS is displayed when a first BOSS is defeated, or the first virtual object as a BOSS is displayed only after all monster virtual objects are defeated. The position condition indicates that the second virtual object is located within a preset position range corresponding to the first virtual object. For example, the virtual environment includes a special position correspondingly, and the first virtual object is automatically displayed when the second virtual object enters a preset position range of the special position.

Figure 5:
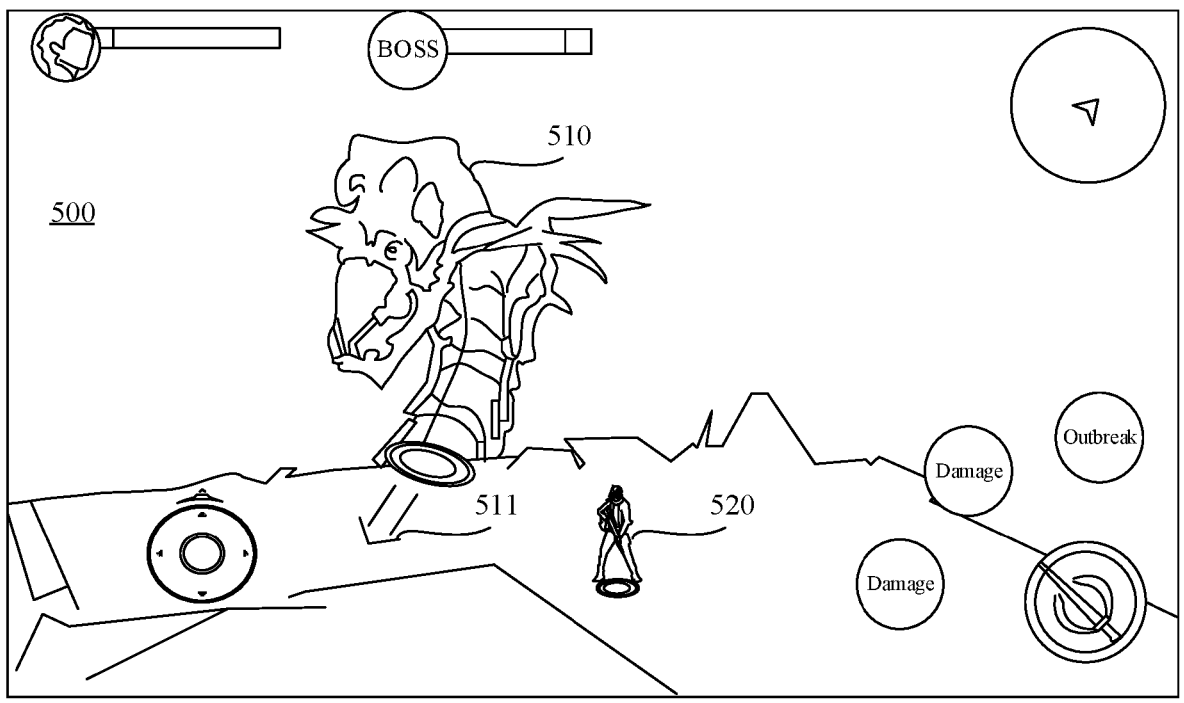
FIG. 5 is a schematic diagram of a virtual environment interface according to one embodiment of this application.

For example, in the virtual environment, the first virtual object faces a first direction, and the second virtual object is located in a second direction of the first virtual object. The first direction and the second direction may be the same or may be different. In an example, the first direction and the second direction are different. As shown in FIG. 5, a virtual environment picture is displayed in a virtual environment interface 500. The virtual environment picture includes a first virtual object 510 and a second virtual object 520. The orientation of the first virtual object 510 is a first direction 511, and the second virtual object 520 is located in a second direction of the first virtual object 510.

Step 402. Display a casting preparation process of the first virtual object casting a target skill, the casting preparation process including a posture change process and an orientation change process that are simultaneously displayed.

In this embodiment, the target skill casting of the first virtual object correspondingly includes a skill casting requirement, and the first virtual object is triggered to cast the target skill when the skill casting requirement is satisfied. For example, the skill casting requirement includes, but is not limited to, one of the following requirement manners.

Method 1. When a distance between the first virtual object and the second virtual object is within a distance requirement range, the casting preparation process of the first virtual object casting the target skill is displayed. For example, when the second virtual object enters the distance requirement range of the first virtual object, the first virtual object is triggered to use the target skill.

Method 2. The first virtual object correspondingly includes a virtual attribute value. When the virtual attribute value changes to a certain extent, the corresponding target skill is triggered. That is, based on the change of the virtual attribute value of the first virtual object, the target skill is determined, and the casting preparation process of the first virtual object casting the target skill is displayed. For example, the virtual attribute value may be a virtual hit point, a virtual aggro point, or the like. In some embodiments, different virtual attribute values correspond to different target skills. Using the virtual attribute value being a virtual hit point as an example, when the virtual damage caused by the second virtual object to the first virtual object reduces the hit point of the first virtual object to a preset hit point, the first virtual object is triggered to use the target skill. Using the virtual attribute value being a virtual aggro point as an example, when the second virtual object attacks the first virtual object, the virtual aggro point of the first virtual object increases with the increase of a fighting time, and when the virtual aggro point reaches a preset threshold, the first virtual object is triggered to use the target skill.

Method 3. The first virtual object periodically casts the target skill within a corresponding life cycle. That is, after the first virtual object triggers a combat state, the first virtual object periodically casts the target skill until it leaves the combat state or is defeated. That is, when a skill casting interval of the first virtual object reaches a preset duration, the casting preparation process of the first virtual object casting the target skill is displayed. In an example, the target skill is a periodic skill with a cycle of 30 s. After entering a combat state, the first virtual object casts the target skill once, and then the skill enters a periodic cooling state that lasts for 30 s. After the periodic cooling state ends, the first virtual object uses the target skill again.

For example, the target skill may be a targeted skill or a non-targeted skill. This is not limited herein. Using the target skill being a targeted skill as an example, after the first virtual object is triggered to cast the target skill, the first virtual object needs to rotate its orientation to a direction corresponding to a position of the second virtual object to cast the target skill toward the second virtual object.

In this embodiment, when the first virtual object is triggered to cast the target skill, the casting preparation process of the first virtual object casting the target skill is displayed. The casting preparation process is a process from a moment the first virtual object is triggered to cast the target skill until the target skill takes effect. For example, the overall casting process of the target skill is divided into skill foreswing, skill casting, and skill backswing, then the casting preparation process above is displayed in the process of skill foreswing.

The process of the first virtual object casting the target skill includes a casting preparation process and a skill effective process. The casting preparation process is a skill casting preparation stage after the first virtual object is triggered to cast the target skill and before the skill is cast on a target position to achieve an attack function. The casting preparation process includes a posture change process and an orientation change process. The posture change process includes a posture performance change of the first virtual object at the casting preparation stage of the target skill. The orientation change process includes an orientation change of the first virtual object with a first direction as an initial orientation and a second direction as a target orientation. That is, at the casting preparation stage, the posture and orientation of the first virtual object change. The orientation change of the first virtual object is determined by a position of the second virtual object in the virtual environment.

The first virtual object determines the second virtual object as an attack target according to an opposition value corresponding to the virtual object that attacks the first virtual object in the virtual environment. That is, the virtual environment includes virtual participant objects that attack the first virtual object (the virtual participant object may be a virtual object of the NPC type or a virtual object of the player character type), and the virtual participant objects include the second virtual object. The opposition value is determined based on an attack situation of each of the virtual participant objects on the first virtual object. An opposition value between each of the virtual participant objects and the first virtual object is determined; and the second virtual object is determined from the virtual participant objects based on the opposition value.

For example, from the virtual participant objects, a virtual participant object with the highest opposition value with the first virtual object is determined as the second virtual object. The opposition value is determined according to a number of attacks of each of the virtual participant objects on the first virtual object; or, the opposition value is determined according to a damage value generated when each of the virtual participant objects attacks the first virtual object; or, the opposition value is determined according to a skill type used by each of the virtual participant objects that is attacking the first virtual object.

In some examples, the opposition value is represented by a hatred/threat value. The virtual participant object may attack the first virtual object to increase the hatred value of the first virtual object to the virtual participant object. For example, the corresponding hatred value is determined according to the numerical value of the virtual damage caused by the virtual participant object to the first virtual object per second. The virtual participant object may alternatively increase/decrease the hatred value by casting skills.

The first virtual object may alternatively select the second virtual object randomly from the virtual objects within an attack range in the virtual environment. For example, there are N player character virtual objects within the attack range of the first virtual object. After the first virtual object triggers a target skill, a second virtual object is randomly selected from the N player character virtual objects as an attack target.

Figure 6:
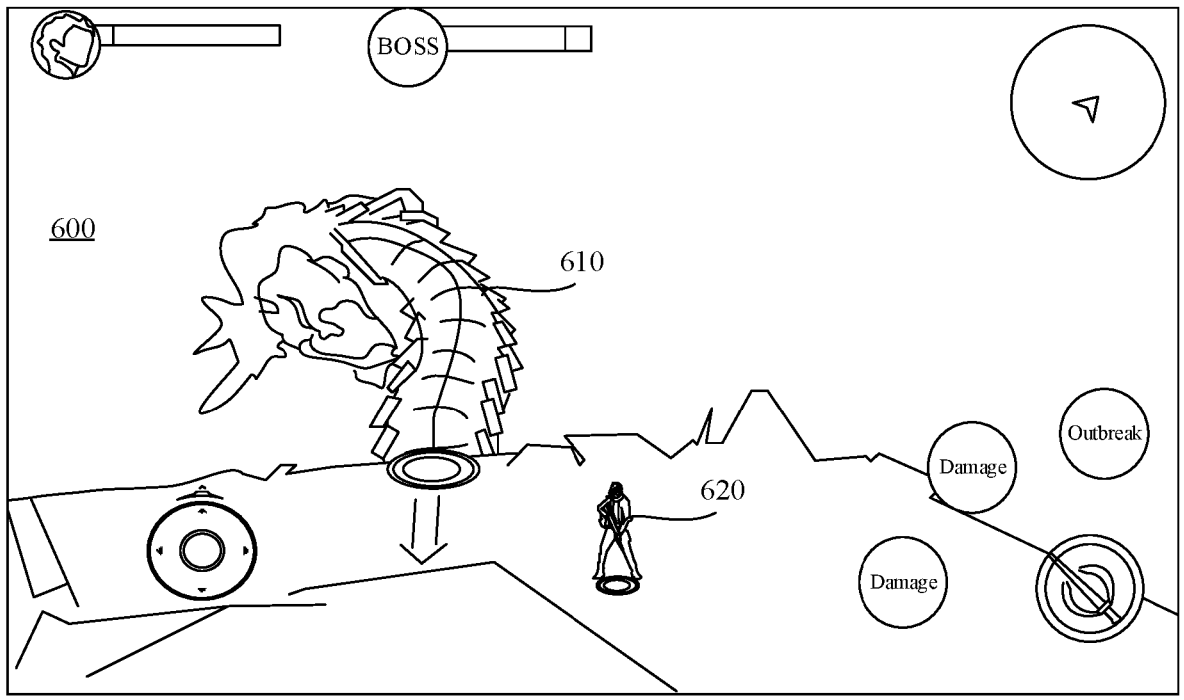
FIG. 6 is a schematic diagram of a virtual environment interface according to another embodiment of this application.

In an example, referring to FIG. 6, a virtual environment picture is displayed in a virtual environment interface 600. The virtual environment picture includes a first virtual object 610 and a second virtual object 620. In the casting preparation process, the posture of the first virtual object 610 changes compared with the posture before casting a target skill, the orientation of the first virtual object 610 also changes compared with the orientation before casting the target skill, and the orientation changes according to the position of the second virtual object 620.

For example, before the orientation of the first virtual object is changed, it is necessary to determine a second direction. That is, in the casting preparation process of the first virtual object casting the target skill, for an orientation change process in the casting preparation process, the second direction is determined based on a position change of the second virtual object in the virtual environment, and the orientation change process in the casting preparation process is determined based on the second direction. A direction of a position corresponding to the second virtual object at a target moment in the casting preparation process relative to the first virtual object is determined as the second direction. That is, in response to the casting preparation process proceeding to the target moment, a direction corresponding to a position of the second virtual object at the target moment is determined as the second direction. The target moment corresponds to the target skill. In an example, the target moment is a preset quantile of a total duration of the casting preparation process of the target skill. For example, the preset quantile is 80%. If a total duration of the casting preparation process is 2.5 s, the corresponding moment is when the casting preparation process proceeds to 2 s, and the direction of the position of the second virtual object relative to the first virtual object is the second direction. Alternatively, the casting preparation process includes n preparation stages, n being a positive integer. The n preparation stages include k preparation stages for determining a second direction, $1 \le k \le n$, and k being an integer. For example, a target position of the second virtual object at an end moment of a $k^{th}$ preparation stage is determined, and the second direction corresponding to an orientation change process in a $(k+1)^{th}$ preparation stage is determined based on the target position. An orientation direction of the first virtual object at the end moment of the $k^{th}$ preparation stage is a first direction corresponding to the orientation change process in the $(k+1)^{th}$ preparation stage, that is, an initial orientation.

For example, in the orientation change process, the orientation change of the first virtual object is determined according to a difference between the first direction and the second direction. In an example, a preset rotation curve is determined according to an angle difference between the first direction and the second direction. The preset rotation curve and the angle difference are correspondingly stored in a preset storage region in a server. The server obtains the corresponding preset rotation curve through query according to the angle difference between the first direction and the second direction, and transmits the preset rotation curve to a terminal. The terminal controls the orientation change process of the first virtual object according to the preset rotation curve.

Step 403. Control, when the casting preparation process ends, the first virtual object to cast the target skill toward the second direction.

Figure 7:
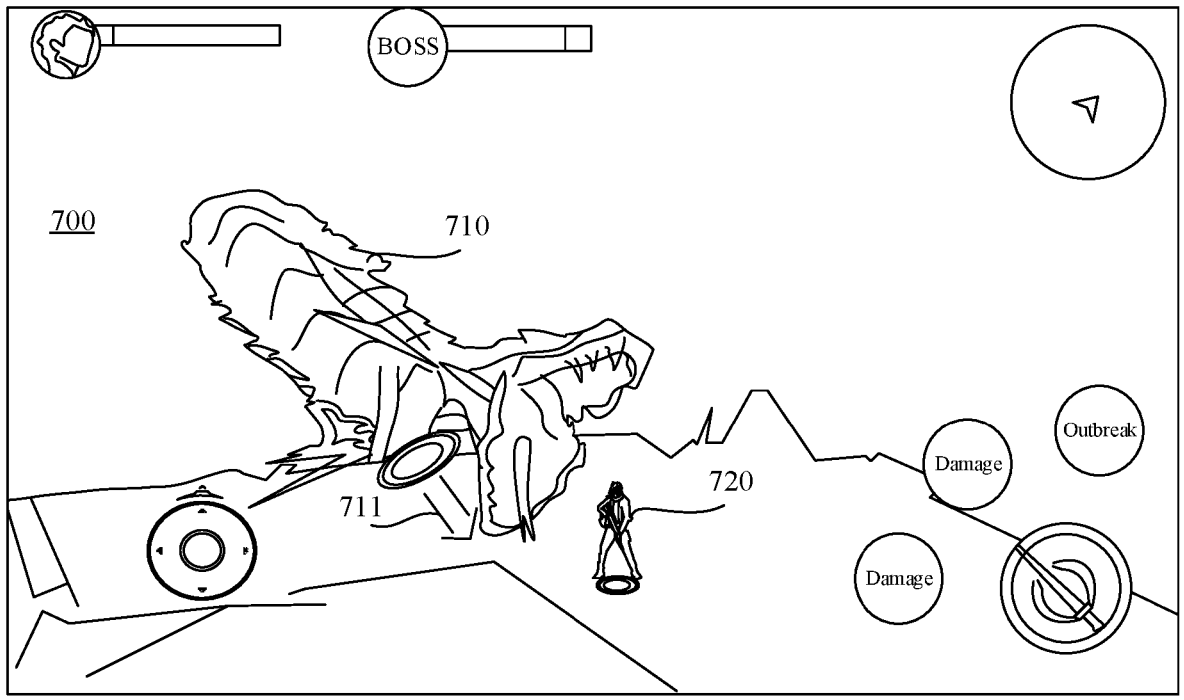
FIG. 7 is a schematic diagram of a virtual environment interface according to another embodiment of this application.

When the casting preparation process ends, a skill effective process of the first virtual object casting the target skill is displayed, and the first virtual object casts the target skill in the second direction in the skill effective process. Referring to FIG. 7, a virtual environment picture is displayed in a virtual environment interface 700. The virtual environment picture includes a first virtual object 710 and a second virtual object 720. After the casting preparation process, the first virtual object 710 faces a second direction 711 and casts a target skill in the second direction 711.

For example, in a skill effective process, the first virtual object causes virtual damage to virtual objects within a preset range of a target position with the second direction as an orientation. The size of the preset range has correspondence with the target skill. In an example, the target skill is a single-target damage skill, after the casting preparation process ends, the first virtual object faces the second direction and performs an attack action of "biting" on the second virtual object as a target object, so that the second virtual object receives the virtual damage corresponding to the target skill. In another example, the target skill is a group-target damage skill, after the casting preparation process ends, the first virtual object faces the second direction and sprays virtual flame in the second direction. The virtual flame causes continuous damage to the virtual objects within a corresponding sector region range, and the virtual objects within the sector region range trigger the DeBuff of "continuous blood loss".

Based on the above, according to the skill casting method of the virtual object provided in the embodiments of this application, in a virtual environment including a first virtual object and a second virtual object, when the first virtual object uses a target skill, a casting preparation process is displayed. The casting preparation process includes a posture change process and an orientation change process that are simultaneously displayed. The posture change process includes a posture performance change of the first virtual object at a casting preparation stage of the target skill. The orientation change process includes an orientation change with a first direction as an initial orientation and a second direction as a target orientation. After the casting preparation process ends, the first virtual object is controlled to cast the target skill toward the second direction. In the process of triggering a virtual object to cast a target skill until the target skill is cast, a posture change and an orientation change are synchronized to display a casting preparation process. Compared to adjusting the orientation first and then displaying the posture change, or displaying the posture change first and then adjusting the orientation change, the synchronous display of the posture change and the orientation change improves how realistic the picture performance is when the virtual object casts the skill, improves the display effect of skill casting, reduces the picture freeze caused by the switch between the orientation change and the posture change, and improves the fluency of picture display.

In addition, according to the skill casting method of the virtual object provided in the embodiments of this application, when the second virtual object satisfies the preset trigger condition, the first virtual object is displayed, and the display of the first virtual object is constrained by the preset trigger condition, avoiding interface confusion caused by displaying a plurality of first virtual objects at the same time, and improving the simplicity of the interface.

Figure 8:
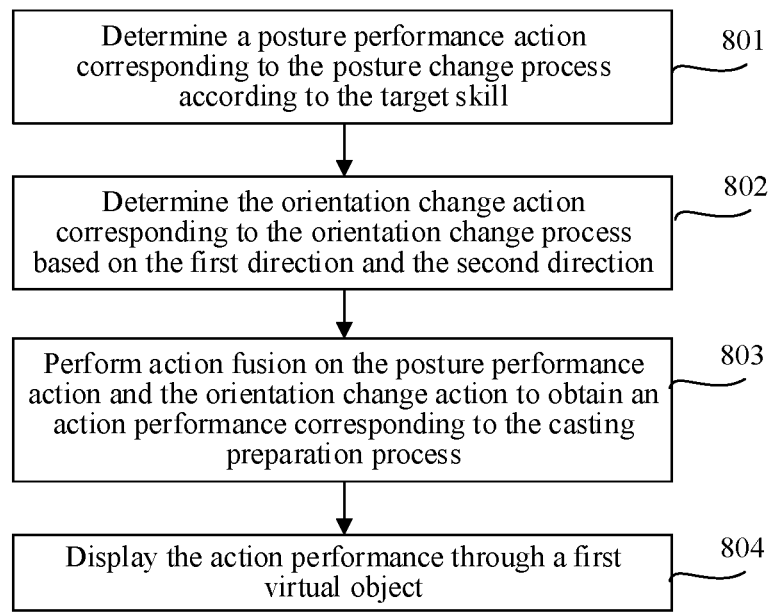
FIG. 8 is a flowchart of a method for displaying a casting preparation process of a target skill according to one embodiment of this application.

FIG. 8 is a flowchart of a method for displaying a casting preparation process of a target skill according to one embodiment of this application. The method includes the following steps.

Step 801. Determine a posture performance action corresponding to the posture change process according to the target skill.

In this embodiment, different target skills correspond to different posture performance actions, and different posture performance actions correspond to different casting preparation durations. For example, the higher the virtual damage that the target skill can cause, the longer the corresponding casting preparation duration is; or, the larger the range of the virtual damage that the target skill can cause, the longer the corresponding casting preparation duration is. This is not limited herein.

Step 802. Determine the orientation change action corresponding to the orientation change process based on the first direction and the second direction.

Before the target skill is cast, the orientation of the first virtual object and the position of the second virtual object are on different sides. That is, when the orientation of the first virtual object is different from the orientation of the position of the second virtual object relative to the first virtual object, the first virtual object needs to change its orientation in the casting preparation process of the target skill. With an orientation of the first virtual object before the target skill is cast as a first direction, and a direction of the position of the second virtual object relative to the first virtual object as a second direction, an orientation change process of the first virtual object is determined according to the first direction and the second direction. For example, a rotation angle of the first virtual object is determined according to the first direction and the second direction, and a corresponding rotation speed is determined according to the rotation angle.

In some embodiments, in this embodiment, in the casting preparation process, the position of the second virtual object in the virtual environment may change. In order to improve the accuracy of the orientation change action, for the orientation change process in the casting preparation process, the second direction is determined based on the position change of the second virtual object in the virtual environment, and then the orientation change action corresponding to the orientation change process is determined based on the first direction and the second direction.

In some embodiments, in this embodiment, the casting preparation process includes n preparation stages. n is a positive integer. In some embodiments, for a $k^{th}$ preparation stage and a $(k+1)^{th}$ preparation stage that are adjacent to each other in the n preparation stages, a target position of the second virtual object at an end moment of the $k^{th}$ preparation stage is determined, and the second direction corresponding to an orientation change process in the $(k+1)^{th}$ preparation stage is determined based on the target position. $1<k<n$, and k is an integer. There is no previous preparation stage adjacent to a first preparation stage. Therefore, a second direction of the first preparation stage is determined based on a position of the second virtual object at a start moment of the first preparation stage.

Step 803. Perform action fusion on the posture performance action and the orientation change action to obtain an action performance corresponding to the casting preparation process.

In this embodiment, after the posture performance action and the orientation change action are determined, action fusion is performed on the posture performance action and the orientation change action to obtain an action performance corresponding to the casting preparation process.

In some embodiments, in this embodiment, the first virtual object correspondingly includes a logical rotation node and a model rotation node. The logical rotation node is used for indicating an orientation change result of the first virtual object in a server. The model rotation node is used for controlling the first virtual object to perform a corresponding action in a client. In some embodiments, when the posture performance action corresponding to the posture change process is determined according to the target skill, the posture change process is determined according to the target skill, and then the posture performance action on the model rotation node is determined based on the posture change process. After the second direction is determined, the logical rotation node is switched to point to the second direction, to represent the orientation change that the first virtual object shows on the client. Then, the orientation change action on the model rotation node is determined based on the first direction and the second direction to which the logical rotation node points. Further, action fusion is performed on the orientation change action on the model rotation node and the posture change action on the model rotation node to obtain rotation data of the model rotation node in the casting preparation process. The rotation data is used for indicating an action performance corresponding to the model rotation node in the casting preparation process.

In some embodiments, in this embodiment, when the orientation change action on the model rotation node is determined based on the first direction and the second direction to which the logical rotation node points, a preset rotation curve is determined according to a difference between the first direction and the second direction, and the orientation change action on the model rotation node is determined according to a rotation speed change corresponding to the preset rotation curve. An orientation of the model rotation node after rotating according to the orientation change action is the same as an orientation corresponding to the logical rotation node.

In an example, the preset rotation curve is stored in a server and has correspondence with the target skill. The server reads, according to a skill identifier corresponding to the target skill, the stored preset rotation curve corresponding to the skill identifier from a database, and transmits the preset rotation curve to a terminal. The terminal controls the first virtual object to rotate according to the preset rotation curve. In another example, the preset rotation curve is acquired based on a preset animation curve. The terminal acquires a corresponding preset animation curve from a server, and modifies the preset animation curve according to a degree of difference between the first direction and the second direction to obtain the preset rotation curve. In an example, the preset rotation curve=TAN(second angle/first angle)*preset animation curve. The second angle is an angle corresponding to the second direction in a preset coordinate system, and the first angle is an angle corresponding to the first direction in the preset coordinate system. That is, the terminal acquires the preset animation curve from the server, acquires the first angle of the first direction relative to the preset coordinate system and the second angle of the second direction relative to the preset coordinate system, determines a ratio of the second angle to the first angle, and determines the preset rotation curve based on a product of a tangent value corresponding to the ratio and the preset animation curve. For example, the preset coordinate system includes, but is not limited to, a Cartesian coordinate system, a planar polar coordinate system, and the like. In this case, the existing preset animation curve is modified based on the angles of the first direction and the second direction in the preset coordinate system to obtain the preset rotation curve, which improves the efficiency of obtaining the preset rotation curve and improves the efficiency of displaying the skill casting process.

Figure 9:
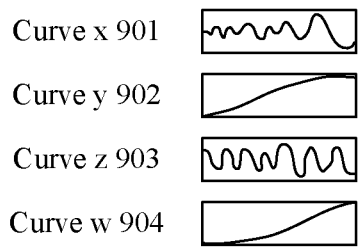
FIG. 9 is a schematic diagram of a quaternion curve according to one embodiment of this application.

In another example, the preset rotation curve may be obtained by conversion through a quaternion curve. That is, a rotation angle of the first virtual object is determined according to the first direction and the second direction, and the rotation angle is converted through the quaternion curve to obtain the preset rotation curve. Refer to FIG. 9 for the specific detail, and details are not described herein again. In this case, the rotation angle is converted through the quaternion curve to obtain the preset rotation curve, without presetting a corresponding rotation animation, which reduces the development cost and improves the efficiency of obtaining the preset rotation curve.

Different skills correspond to different casting preparation durations, so it is necessary to set different action fusion times for different skills, to control the speed of the orientation change of the first virtual object to achieve a better attack performance. For example, in the orientation change process, the rotation speed corresponding to the first virtual object=rotation angle/rotation time. The rotation angle is an angle difference between the first direction and the second direction. The rotation time is a length of time that elapses when the first virtual object rotates from the first direction to the second direction.

For example, the rotation speed may be controlled through the preset rotation curve. The preset rotation curve is stored in a server and has correspondence with the target skill. In an example, the server reads, according to a skill identifier corresponding to the target skill, the stored preset rotation curve corresponding to the skill identifier from a database, and transmits the preset rotation curve to a terminal. The terminal controls the first virtual object to rotate according to the preset rotation curve. Alternatively, the terminal acquires a corresponding preset animation curve from a server, and modifies the preset animation curve according to a degree of difference between the first direction and the second direction to obtain the preset rotation curve. In an example, the preset rotation curve=TAN(second angle/first angle)*preset animation curve. The second angle is an angle corresponding to the second direction in a preset coordinate system, and the first angle is an angle corresponding to the first direction in the preset coordinate system. That is, the terminal acquires the preset animation curve from the server, acquires the first angle of the first direction relative to the preset coordinate system and the second angle of the second direction relative to the preset coordinate system, determines a ratio of the second angle to the first angle, and determines the preset rotation curve based on a product of a tangent value corresponding to the ratio and the preset animation curve. For example, the preset coordinate system includes, but is not limited to, a Cartesian coordinate system, a planar polar coordinate system, and the like.

The preset rotation curve may be obtained by conversion through a quaternion curve. That is, a rotation angle of the first virtual object is determined according to the first direction and the second direction, and the rotation angle is converted through the quaternion curve to obtain the preset rotation curve. In an example, as shown in FIG. 9, a quaternion curve 900 includes curve x 901, curve y 902, curve z 903, and curve w 904. Rotation angle A=x+yi+zi+wi, i being an imaginary unit. The rotation angle A is converted correspondingly according to the curve x 901, the curve y 902, the curve z 903, and the curve w 904.

Step 804. Display the action performance through a first virtual object.

The action performance after the action fusion is loaded on the first virtual object, and the action performance is displayed through the first virtual object to display the casting preparation process.

In some embodiments, in this embodiment, the model rotation node is rotated based on the rotation data to control the first virtual object to display the action performance.

In this embodiment, the action performance may be action performances of all parts of the first virtual object, or may be action performances of some parts of the first virtual object. In one embodiment, the action performance is action performances of all parts of the first virtual object, that is, in the casting preparation process, all parts of the first virtual object change in action. In another embodiment, the action performance is action performances of some parts of the first virtual object, that is, in the casting preparation process, some parts of the first virtual object change in action. For example, the first virtual object includes a first part connected to a virtual surface and a second part connected to the first part but not connected to the virtual surface. In the casting preparation process, the first part does not move, and the action performance is displayed by the second part. The virtual surface may be a surface of a virtual ground or a virtual house. This is not limited in this embodiment.

Based on the above, in the method for displaying the casting preparation process of the target skill provided in this embodiment, the orientation change action is determined based on the position of the second virtual object according to the posture performance action corresponding to the target skill, and action fusion is performed on the posture performance action and the orientation change action to display the casting preparation process when the first virtual object casts the skill, which improves the display effect of skill casting, fuses the separate posture change action and orientation change action into an action performance, reduces the freezing caused by the switch between the posture change action and the orientation change action, and improves the fluency of picture display.

In addition, in this embodiment, in the casting preparation process, the second direction is determined based on the position change of the second virtual object in the virtual environment. That is, the second direction is adjusted according to the movement of the second virtual object, which improves the accuracy of the determined second direction, and then the orientation change action is determined based on the second direction, improving the accuracy of the orientation change action. Moreover, the casting preparation process includes a plurality of stages, and the second direction corresponding to a next preparation stage is determined based on the position of the second virtual object at an end moment of a previous preparation stage. In the case of improving the accuracy of the second direction, the casting preparation process is displayed in stages, which avoids the rigid and unreal picture caused by the sudden change of the first virtual object, and improves how realistic the picture display is. The second direction required for the casting preparation process is adjusted based on the refined stages, so that the action change of the first virtual object is smoother and more realistic.

Furthermore, in this embodiment, the orientation change result of the virtual object in the server is determined based on the logical rotation node, then the orientation change action on the model rotation node is determined based on the orientation change result indicated by the logical rotation node, and the orientation change action and the posture change action on the model rotation node are fused to determine the final rotation data. The model rotation node is controlled to rotate through the rotation data to display the casting preparation process, the logical rotation node records the server data, and the model rotation node determines the control of the performance of the client through the server data, which improves how realistic the picture display is during skill casting.

Figure 10:
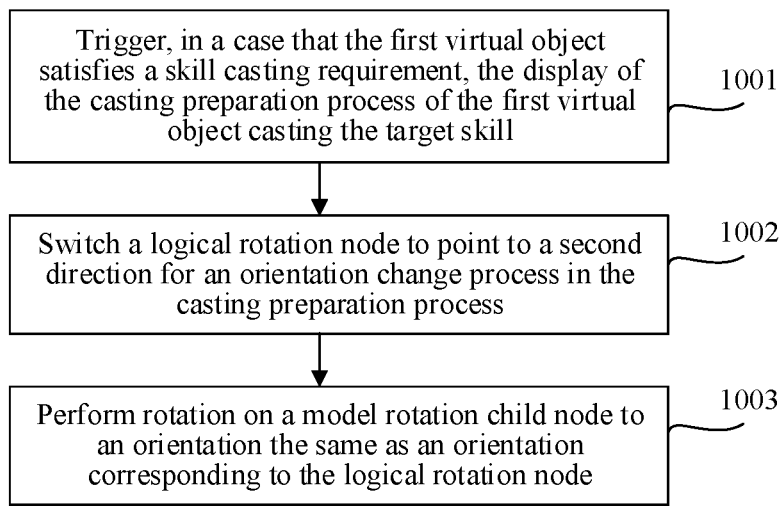
FIG. 10 is a flowchart of a logical method of a terminal according to one embodiment of this application.

FIG. 10 shows a logical rotation method of a terminal corresponding to a skill casting method of a virtual object according to one embodiment of this application. The method includes the following steps.

Step 1001. Trigger, when the first virtual object satisfies a skill casting requirement, the display of the casting preparation process of the first virtual object casting the target skill.

In this embodiment, different skills correspond to different skill casting requirements. For example, the target skill can cause virtual damage to virtual objects within a certain range. For example, when the first virtual object satisfies a first casting requirement, the first virtual object is controlled to cast a first skill, and the first skill causes high virtual damage to virtual objects within a sector range in front of the first virtual object. Alternatively, the target skill can have a control effect on virtual objects within a certain range. For example, when the first virtual object satisfies a second casting requirement, the first virtual object is controlled to cast a second skill, and the second skill has a constraint effect on virtual objects within a circular range in front of the first virtual object, so that the player character virtual object in a comfortable state cannot move. Alternatively, the target skill can achieve both damage and control effects. This is not limited herein.

A user controls the second virtual object in the terminal to perform activities, and some activities of the second virtual object affect the first virtual object. For example, when the second virtual object uses a skill to the first virtual object, the virtual hit point corresponding to the first virtual object decreases. When the server detects that an activity of the second virtual object triggers a target skill of the first virtual object, the server transmits triggering information of the target skill to the terminal. After the terminal receives the triggering information, a casting process of the target skill of the first virtual object is displayed according to the triggering information. The skill casting process includes a casting preparation process and a skill effective process.

In this embodiment, the target skill is driven in chronological order into segments. For example, the target skill is divided into m skill segments, m≥1, and each skill segment has a fixed performing time. For example, if an execution time corresponding to an $i^{th}$ skill segment is Ti, when the $i^{th}$ skill segment starts to be performed, it needs to wait for Ti before performing an $(i+1)^{th}$ skill segment, until all skill segments are performed, indicating that the casting of the target skill is completed, 1≤i≤m. For example, when the target skill is cast, the server determines the second virtual object according to the relationships between the current first virtual object and all virtual objects in the current virtual environment. In an example, the first virtual object has a hatred value for other virtual objects in the virtual environment, and when a virtual object with the highest hatred value from other virtual objects is determined as the second virtual object, the server transmits the triggering information to the terminal. The triggering information includes information about the second virtual object (hatred target) and skill information of the target skill. In each skill segment, the server transmits control information in the skill casting process to the terminal, and the terminal displays the corresponding virtual environment picture according to the control information.

Step 1002. Switch a logical rotation node to point to a second direction for an orientation change process in the casting preparation process.

For example, the skill information includes a logical performance for describing that the current target skill needs to change the orientation, and the skill information also includes a skill segment for indicating that the orientation changes when the first virtual object uses the target skill. In an example, the skill information indicates the change of orientation of the first virtual object at the beginning of a first skill segment. For example, after the server determines that the first virtual object casts the target skill according to the relationship between the first virtual object and the second virtual object, in the casting process of the target skill, the server cannot force-sync the orientation of the first virtual object to the terminal. That is, in the casting process of the target skill, the terminal controls the orientation of the first virtual object to change.

In the server, the logical orientation of the first virtual object has been directed to the second direction, and the orientation of the first virtual object displayed in the terminal changes at a preset speed. For example, the orientation change performance of the first virtual object in the virtual environment is achieved through a Unity game engine. The logical rotation node is used for indicating the orientation change result of the first virtual object in the server.

Figure 11:
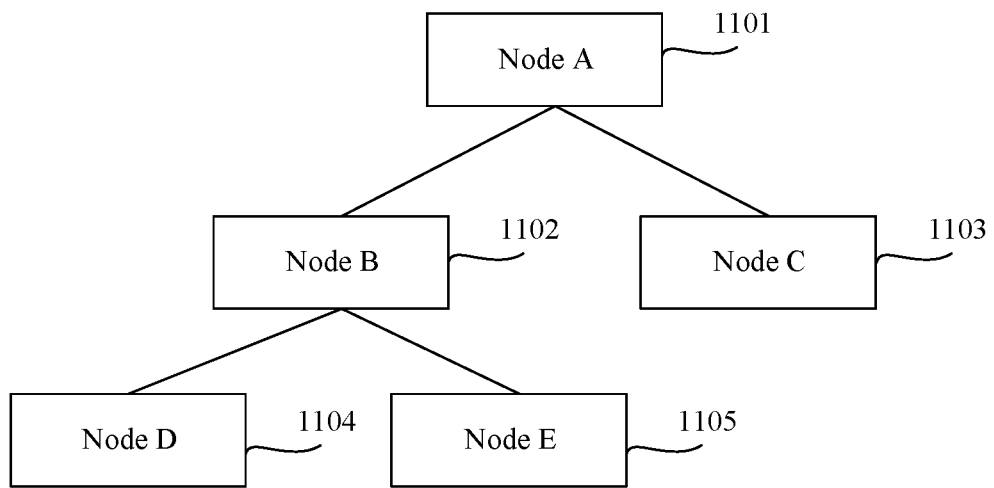
FIG. 11 is a schematic diagram of structural nodes of a virtual object according to one embodiment of this application.
Figure 12:
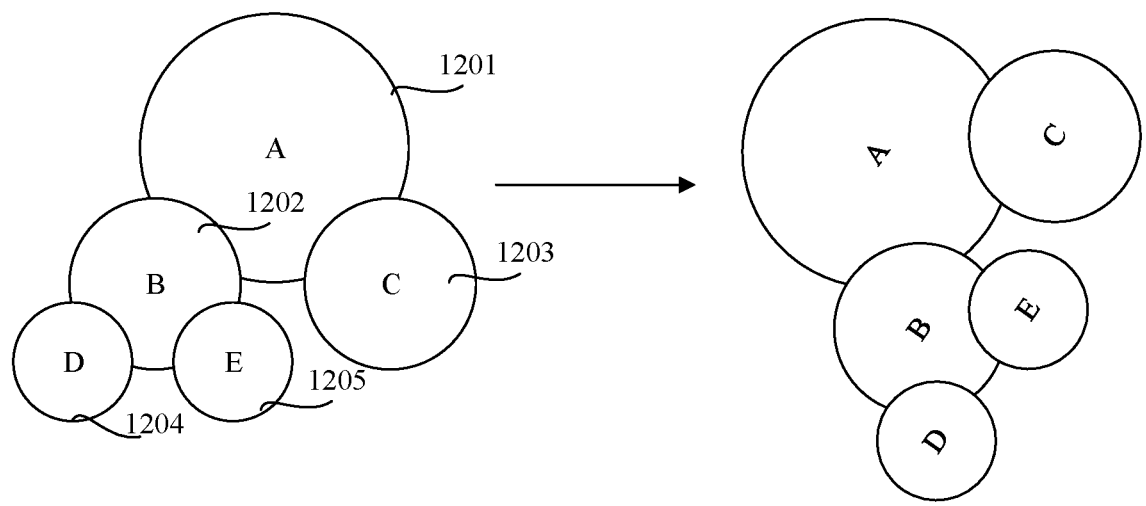
FIG. 12 is a schematic diagram of structural nodes of a virtual object according to another embodiment of this application.

For example, in order to conveniently manage interactable objects in the virtual scene, the Unity engine organizes the virtual objects in the virtual environment according to a tree-like structure. When an object on a certain node in the tree is moved and rotated, an object on its child node also moves and rotates, which is passed down layer by layer. As shown in FIG. 11, a structure of a virtual object includes node A1101, node B1102, node C1103, node D1104, and node E1105, and there are different upper and lower relationships for the nodes. FIG. 12 shows the rotation performance of the structure of the virtual object corresponding to FIG. 11. When the node A1201 rotates, it drives the child nodes B1202 and C1203 of the node A1201 to change their position and rotation, and the change of the position and rotation of B1202 also drives the node D1204 and the node E1205 to change their position and rotation.

In this embodiment, the first virtual object in the virtual environment also has different nodes correspondingly, that is, a logical rotation node, a transition node, and a model rotation child node. The transition node can drive the model rotation node to rotate, so the terminal can control the rotation of the logical rotation node and the rotation of the transition node respectively to implement separate control of the logical rotation node and the model rotation node. For example, if the logical rotation node rotates counterclockwise by X degrees, and the transition node rotates clockwise by X degrees, the orientation of the model of the first virtual object in the virtual environment does not change by rotation.

Figure 13:
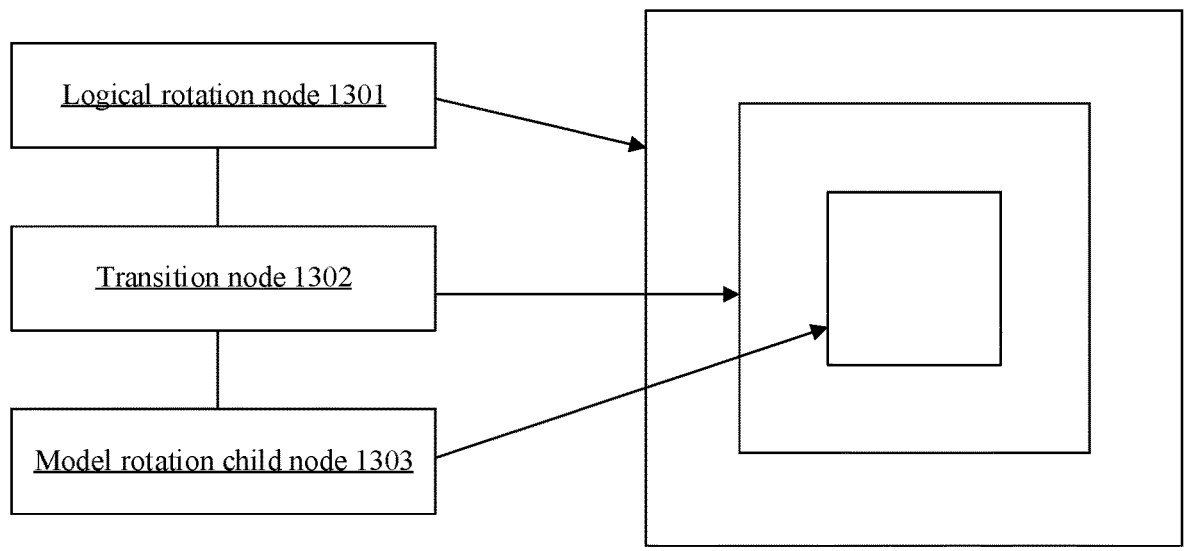
FIG. 13 is a schematic diagram of a tree-like structure organization form of a first virtual object according to one embodiment of this application.

For example, a tree-like structure organization form of a first virtual object is shown in FIG. 13. A node in an upper layer is a logical rotation node 1301, a node in a middle layer is a transition node 1302, and a node in a lower layer is a model rotation child node 1303 mounting the model resource of the first virtual object. When the logical orientation of the first virtual object in the virtual environment changes, the rotation of the logical rotation node 1301 changes, which drives the transition node 1302 and the model rotation child node 1303 to change. In this case, the first virtual object displayed on the terminal changes in orientation.

Figure 14:
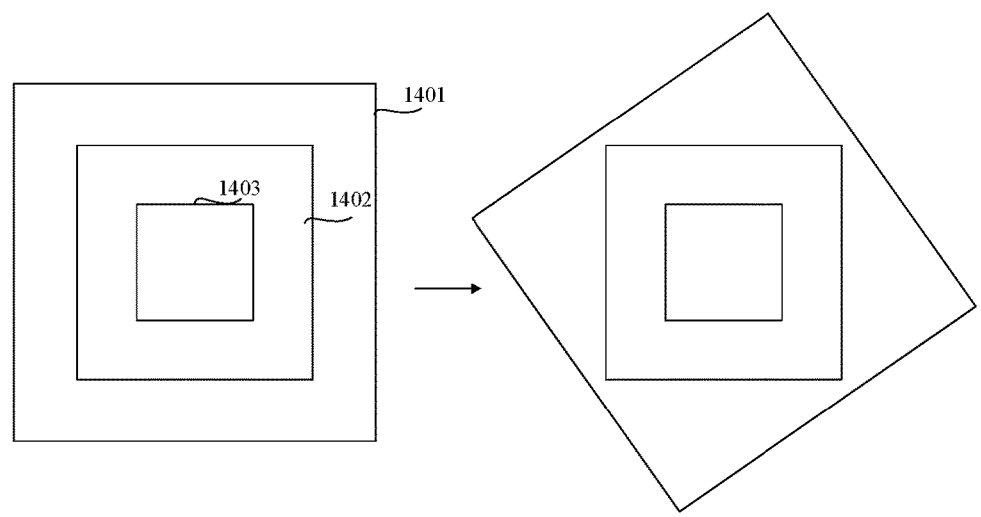
FIG. 14 is a schematic diagram of rotation of a tree-like structure of a first virtual object according to one embodiment of this application.

For example, the logical rotation node is used for indicating the orientation change result of the first virtual object in the server, the model rotation child node is a child node mounted under the logical rotation node, and the logical rotation node determines a final orientation of the model rotation child node. The terminal switches the logical rotation node to a rotation state corresponding to the second direction according to information of the second direction corresponding to the control information transmitted by the server, that is, the logical rotation node points to the second direction. The logical rotation node is a root node, and its orientation change drives the child node to change. Therefore, it is necessary to perform reverse rotation through the transition node, so that the model of the first virtual object in the virtual environment does not appear to be rotated. After reverse rotation, the transition node and the model rotation child node point to the same direction as the initial orientation. As shown in FIG. 14, a logical rotation node 1401 points to the second direction, and both a transition node 1402 and a model rotation child node 1403 point to the first direction.

Step 1003. Perform rotation on a model rotation child node to an orientation the same as an orientation corresponding to the logical rotation node.

Figure 15:
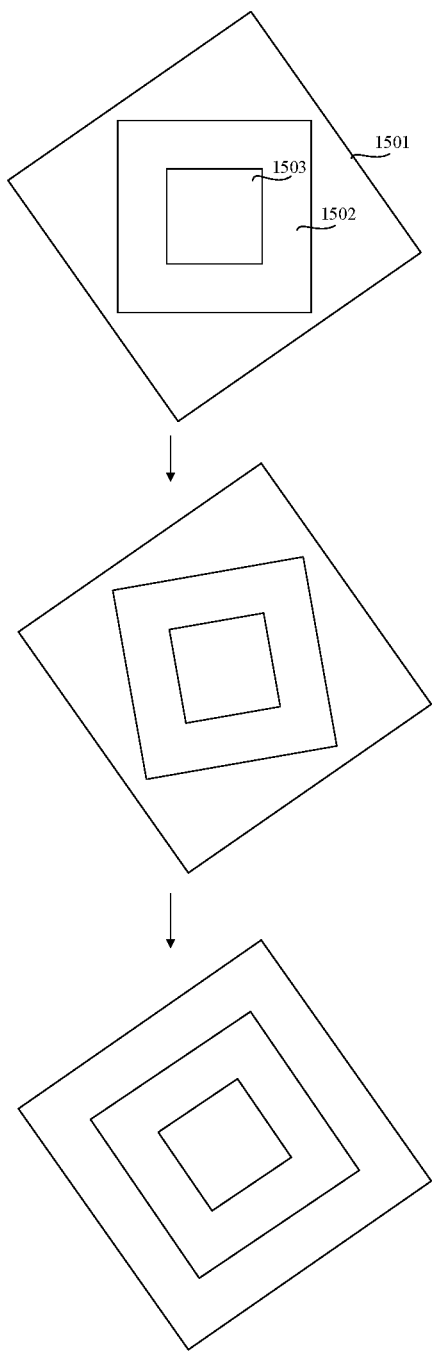
FIG. 15 is a schematic diagram of rotation of a tree-like structure of a first virtual object according to another embodiment of this application.

In the casting preparation process, the orientation of the model rotation child node is controlled to be gradually the same as the orientation corresponding to the logical rotation node, that is, the corresponding display effect is that the orientation of the first virtual object gradually rotates to the second direction. As shown in FIG. 15, after rotation, a transition node 1502 and a rotation node 1503 are aligned with a logical rotation node 1501. The corresponding virtual environment picture is displayed as that the orientation of the first virtual object rotates to the second direction, and the target skill is cast in this direction. The performing process of the model rotation child node is the orientation change process of the first virtual object.

For example, a preset rotation curve is determined according to a difference between the first direction and the second direction, and the orientation of the model rotation child node is controlled to rotate to be aligned with the logical rotation node according to a rotation speed change corresponding to the preset rotation curve.

For example, a preset rotation animation is acquired. The preset rotation animation is an animation in which the pre-designed first virtual object rotates by a preset angle (such as 120°, the preset angle varies according to changes in the specific virtual scene). The rotation of the animation is made at a root node, then a rotation animation curve of the root node is extracted, and the animation of the root node is removed from the original animation. In this case, the animation resource is made into a rotation curve and an animation performance that does not rotate in place. In the orientation change process, the terminal plays the animation with the rotation removed, and scales the preset rotation curve proportionally according to the current rotation angle, to rotate to the corresponding angle according to the rhythm of the preset rotation curve. Under the joint cooperation between animation resources and nodes, the first virtual object completes the casting preparation process of the target skill.

Based on the above, through different control methods of the logical rotation node and the model rotation child node, the skill casting method of the virtual object provided in the embodiments of this application achieves the display of the orientation change of the first virtual object in the casting preparation process, improving the display effect of skill casting.

In addition, in the skill casting method of the virtual object provided in the embodiments of this application, when the first virtual object satisfies the skill casting requirement, the display of the casting preparation process of the first virtual object casting the target skill is triggered, and the skill casting moment is constrained by the skill casting requirement to cast the skill when the requirement is satisfied, so that the skill can be cast in an orderly manner, avoiding the untidy interface caused by the random casting of the skill, reducing the load during skill casting. Moreover, the skill casting requirement may include various cases. For example, a virtual attribute value of the first virtual object satisfies the requirement, or a distance between the first virtual object and the second virtual object satisfies the requirement, or a skill casting interval of the first virtual object satisfies the requirement. According to the specific situation, the skill casting requirement may be flexibly set to improve the flexibility of skill casting.

Figure 16:
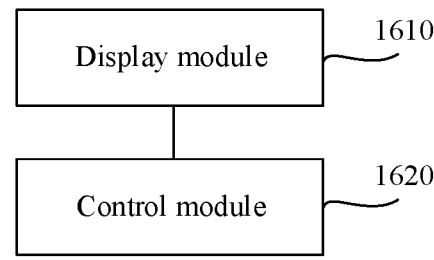
FIG. 16 is a structural block diagram of a skill casting apparatus of a virtual object according to one embodiment of this application.

FIG. 16 is a structural block diagram of a skill casting apparatus of a virtual object according to one embodiment of this application. The apparatus includes:

a display module 1610, configured to display a first virtual object, the first virtual object being in a virtual environment, the virtual environment further including a second virtual object, the first virtual object facing a first direction, and the second virtual object being located at a second direction of the first virtual object;

the display module 1610, further configured to display, when a target skill is triggered on the first virtual object, a casting preparation process of the first virtual object casting the target skill, the casting preparation process being a process from a moment the first virtual object is triggered to cast the target skill until the target skill takes effect, and the casting preparation process including a posture change process and an orientation change process that are simultaneously displayed, the posture change process including a posture performance change of the first virtual object at a casting preparation stage of the target skill, and the orientation change process including an orientation change of the first virtual object with the first direction as an initial orientation and the second direction as a target orientation; and a control module 1620, configured to control, when the casting preparation process ends, the first virtual object to cast the target skill toward the second direction.

Figure 17:
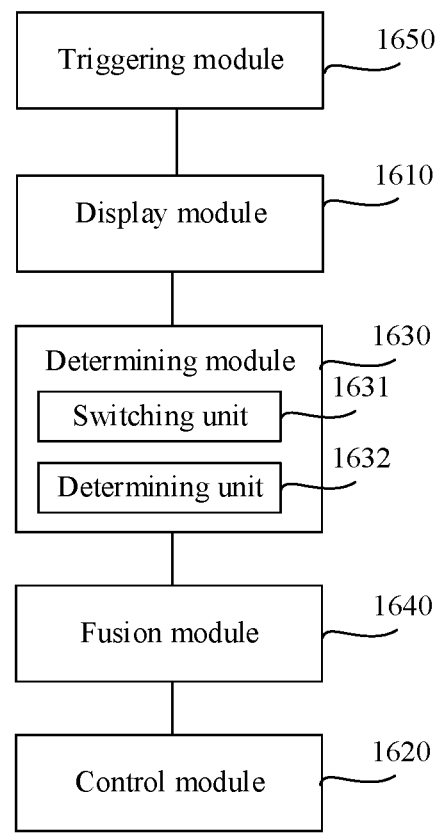
FIG. 17 is a structural block diagram of a skill casting apparatus of a virtual object according to another embodiment of this application.

In one embodiment, as shown in FIG. 17, the apparatus further includes:

a determining module 1630, configured to determine a posture performance action corresponding to the posture change process according to the target skill; and the determining module 1630, further configured to determine an orientation change action corresponding to the orientation change process according to the first direction and the second direction; and the apparatus further includes: a fusion module 1640, configured to perform action fusion on the posture performance action and the orientation change action to obtain an action performance corresponding to the casting preparation process; and the display module 1610, further configured to display the action performance through the first virtual object to display the casting preparation process.

In one embodiment, the determining module 1630 is further configured to determine, for the orientation change process in the casting preparation process, the second direction based on a position change of the second virtual object in the virtual environment; and the determining module 1630 is further configured to determine an orientation change action corresponding to the orientation change process according to the first direction and the second direction.

In one embodiment, the casting preparation process includes n preparation stages, and n is a positive integer;

the determining module 1630 is further configured to determine a target position of the second virtual object at an end moment of a $k^{th}$ preparation stage, $1 \leq k \leq n$, and k being an integer; and the determining module 1630 is further configured to determine the second direction corresponding to the orientation change process in a $(k+1)^{th}$ preparation stage based on the target position, a second direction of a first preparation stage being determined based on a position of the second virtual object at a start moment of the first preparation stage.

In one embodiment, the first virtual object correspondingly includes a logical rotation node and a model rotation node;

the determining module 1630 includes:

a switching unit 1631, configured to switch the logical rotation node to point to the second direction, the logical rotation node being used for indicating an orientation change result of the first virtual object in a server; and a determining unit 1632, configured to determine an orientation change action on the model rotation node based on the first direction and the second direction to which the logical rotation node points; and the fusion module 1640 is further configured to perform action fusion on the orientation change action on the model rotation node and a posture change action on the model rotation node to obtain rotation data of the model rotation node in the casting preparation process, the rotation data being used for indicating an action performance corresponding to the model rotation node in the casting preparation process.

In one embodiment, the determining unit 1632 is further configured to determine a preset rotation curve according to a difference between the first direction and the second direction; and determine the orientation change action on the model rotation node according to a rotation speed change corresponding to the preset rotation curve, an orientation of the model rotation node after rotating according to the orientation change action being the same as an orientation corresponding to the logical rotation node.

In one embodiment, the determining unit 1632 is further configured for an acquiring unit 1631 to acquire a preset animation curve; acquire a first angle of the first direction relative to a preset coordinate system and a second angle of the second direction relative to the preset coordinate system; determine a ratio of the second angle to the first angle; and determine the preset rotation curve based on a product of a tangent value corresponding to the ratio and the preset animation curve.

In one embodiment, the determining unit 1632 is further configured to determine a rotation angle according to the first direction and the second direction; and convert the rotation angle through a quaternion curve to obtain the preset rotation curve.

In one embodiment, the apparatus further includes a triggering module 1650 configured to trigger, when the first virtual object satisfies a skill casting requirement, the display of the casting preparation process of the first virtual object casting the target skill.

In one embodiment, the first virtual object correspondingly includes a virtual attribute value; and the triggering module 1650 is further configured to trigger, when the virtual attribute value of the first virtual object reaches an attribute threshold, the display of the casting preparation process of the first virtual object casting the target skill.

In one embodiment, the triggering module 1650 is further configured to trigger, when a distance between the first virtual object and the second virtual object is within a distance requirement range, the display of the casting preparation process of the first virtual object casting the target skill.

In one embodiment, the triggering module 1650 is further configured to trigger, when a skill casting interval of the first virtual object reaches a preset duration, the display of the casting preparation process of the first virtual object casting the target skill.

In one embodiment, the virtual environment includes virtual participant objects that attack the first virtual object, and the virtual participant objects include the second virtual object;

the determining module 1630 is further configured to determine an opposition value between each of the virtual participant objects and the first virtual object, the opposition value being determined based on an attack situation of each of the virtual participant objects on the first virtual object; and the determining module 1630 is further configured to determine the second virtual object from the virtual participant objects based on the opposition value.

In one embodiment, the determining module 1630 is further configured to determine a virtual participant object with a highest opposition value from the virtual participant objects as the second virtual object.

In one embodiment, the opposition value is determined according to a number of attacks of each of the virtual participant objects on the first virtual object;

or, the opposition value is determined according to a damage value generated when each of the virtual participant objects attacks the first virtual object;

or, the opposition value is determined according to a skill type used by each of the virtual participant objects that is attacking the first virtual object.

In one embodiment, the display module 1610 is further configured to display, when the second virtual object satisfies a preset trigger condition, the first virtual object in the virtual environment, the preset trigger condition including at least one of a task selection condition, an object order display condition, and a position condition;

the task selection condition indicating that a task selected by the second virtual object corresponds to the first virtual object;

the object order display condition indicating that the virtual environment includes n first virtual objects, and when a $k^{th}$ first virtual object is displayed, the second virtual object completes virtual battles with previous (k−1) first virtual objects, n being a positive integer, and 1<k≤n; and the position condition indicating that the second virtual object is located within a preset position range corresponding to the first virtual object.

Based on the above, according to the skill casting apparatus of the virtual object provided in the embodiments of this application, in a virtual environment including a first virtual object and a second virtual object, when the first virtual object uses a target skill, a casting preparation process is displayed. The casting preparation process includes a posture change process and an orientation change process that are simultaneously displayed. The posture change process includes a posture performance change of the first virtual object at a casting preparation stage of the target skill. The orientation change process includes an orientation change with a first direction as an initial orientation and a second direction as a target orientation. After the casting preparation process ends, the first virtual object is controlled to cast the target skill toward the second direction. In the process of triggering a virtual object to cast a target skill until the target skill is cast, a posture change and an orientation change are synchronized to display a casting preparation process. Compared with adjusting the orientation change first and then displaying the posture change, or displaying the posture change first and then adjusting the orientation change, the synchronous display of the posture change and the orientation change improves how realistic the picture performance is when the virtual object casts the skill, improves the display effect of skill casting, reduces the picture freeze caused by the switch between the orientation change and the posture change, and improves the fluency of picture display.

The skill casting apparatus of the virtual object provided in the foregoing embodiments is illustrated with an example of division of the foregoing functional modules. In some embodiments, the functions may be allocated to and completed by different functional modules according to requirements, that is, the internal structure of the device is divided into different functional modules, to implement all or some of the functions described above. In addition, the skill casting apparatus of the virtual object and the skill casting method of the virtual object provided in the foregoing embodiments belong to the same concept. For a specific implementation process, refer to the method embodiment, and details are not described herein again.

Figure 18:
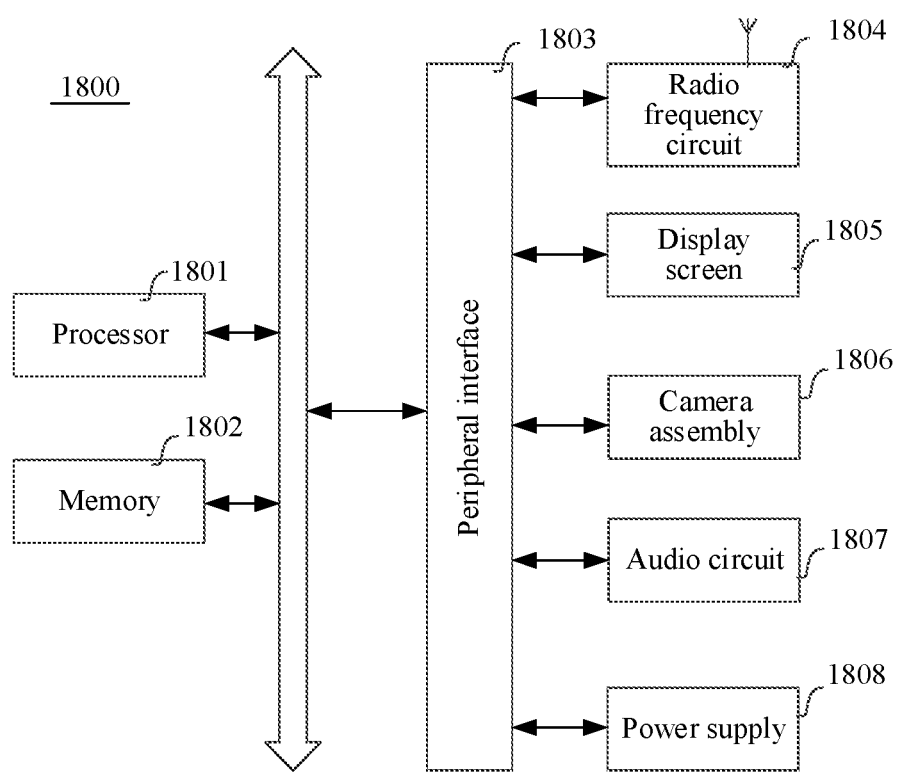
FIG. 18 is a structural block diagram of a terminal according to one embodiment of this application.

FIG. 18 is a structural block diagram of a terminal 1800 according to one embodiment of this application. The terminal 1800 may be: a smartphone, a tablet computer, an MP3 player, an MP4 player, a notebook computer, or a desktop computer. The terminal 1800 may also be referred to as another name such as user equipment, a portable terminal, a laptop terminal, or a desktop terminal.

Generally, the terminal 1800 includes: a processor 1801 and a memory 1802.

The processor 1801 may include one or more processing cores, for example, a 4-core processor or an 8-core processor. The processor 1801 may be implemented in at least one hardware form of digital signal processing (DSP), field-programmable gate array (FPGA), and programmable logic array (PLA). The processor 1801 may also include a main processor and a co-processor. The main processor is a processor for processing data in a wake-up state, also referred to as a central processing unit (CPU). The coprocessor is a low power consumption processor configured to process data in a standby state. In some embodiments, the processor 1801 may be integrated with a graphics processing unit (GPU). The GPU is configured to be responsible for rendering and drawing content that needs to be displayed by a display screen. In some embodiments, the processor 1801 may also include an artificial intelligence (AI) processor. The AI processor is configured to process a computing operation related to machine learning.

The memory 1802 may include one or more computer-readable storage media that may be non-transitory. The memory 1802 may also include a high-speed random-access memory and a non-volatile memory, such as one or more magnetic disk storage devices or a flash storage device. In some embodiments, the non-transient computer-readable storage medium in the memory 1802 is configured to store at least one instruction, and the at least one instruction is used to be executed by the processor 1801 to implement the skill casting method of the virtual object provided in the method embodiments of this application.

In some embodiments, the terminal 1800 may In some embodiments include: a peripheral interface 1803 and at least one peripheral. The processor 1801, the memory 1802, and the peripheral interface 1803 may be connected through a bus or a signal cable. Each peripheral may be connected to the peripheral interface 1803 through a bus, a signal cable, or a circuit board. Specifically, the peripheral includes at least one of a radio frequency circuit 1804, a display screen 1805, a camera assembly 1806, an audio circuit 1807, and a power supply 1808.

A person skilled in the art may understand that the structure shown in FIG. 18 constitutes no limitation on the terminal 1800, and the terminal may include more or fewer components than those shown in the figure, or some components may be combined, or a different component deployment may be used.

A person of ordinary skill in the art may understand that all or some of the steps of the methods in the embodiments may be implemented by a program instructing relevant hardware. The program may be stored in a computer-readable storage medium. The computer-readable storage medium may be the computer-readable storage medium included in the memory in the foregoing embodiment, or may be a computer-readable storage medium that exists independently and that is not assembled in a terminal. The computer-readable storage medium stores at least one instruction, at least one program, a code set, or an instruction set, the at least one instruction, the at least one program, the code set or the instruction set being loaded and executed by a processor to implement the skill casting method of the virtual object in the foregoing embodiments.

In some embodiments, the computer-readable storage medium may include: a read only memory (ROM), a random access memory (RAM), a solid state drive (SSD), an optical disc, or the like. The RAM may include a resistance RAM (ReRAM) and a dynamic RAM (DRAM). The sequence numbers of the foregoing embodiments of this application are merely for description purpose, and are not intended to indicate priorities of the embodiments.

A person of ordinary skill in the art may understand that all or some of the steps in the foregoing embodiments may be implemented by hardware or a program instructing relevant hardware. The program may be stored in a computer-readable storage medium. The storage medium may be a ROM, a magnetic disk, or an optical disc, or the like.

What is claimed is:

1. A skill casting method of a virtual object, performed by a terminal, the method comprising:
    displaying a first virtual object in a virtual environment, the virtual environment further comprising a second virtual object, the first virtual object facing a first direction, and the second virtual object being located at a second direction of the first virtual object;
    displaying a casting preparation process of the first virtual object casting a target skill when the target skill is triggered on the first virtual object, wherein the casting preparation process comprises an orientation change process and comprises n preparation stages, n being an integer the orientation change process comprising an orientation change of the first virtual object with the first direction as an initial orientation and the second direction as a target orientation; and
    controlling the first virtual object to cast the target skill toward the second direction when the casting preparation process ends,
    wherein displaying the casting preparation process of the first virtual object casting the target skill comprises:
        determining the second direction based on a position change of the second virtual object in the virtual environment, comprising:
            determining a target position of the second virtual object at an end moment of a $k^{th}$ preparation stage, 1<k<n, and k being an integer; and
            determining the second direction corresponding to the orientation change process in a $(k+1)^{th}$ preparation stage based on the target position,
        a second direction of a first preparation stage being based on a position of the second virtual object at a start moment of the first preparation stage; and
        determining an orientation change action corresponding to the orientation change process based on the first direction and the second direction.

2. The method according to claim 1, wherein the casting preparation process further comprises a posture change process, the posture change process comprising a posture performance change of the first virtual object, and the displaying the casting preparation process of the first virtual object casting the target skill further comprises:
    determining a posture performance action corresponding to the posture change process according to the target skill;
    obtaining an action performance corresponding to the casting preparation process based on the posture performance action and the orientation change action; and
    displaying the action performance through the first virtual object to display the casting preparation process.

3. The method according to claim 2, wherein the first virtual object comprises a logical rotation node and a model rotation node;
    the determining the orientation change action based on the first direction and the second direction comprises:
        switching the logical rotation node to point to the second direction, the logical rotation node indicating an orientation change result of the first virtual object in a server; and
        determining an orientation change action on the model rotation node based on the first direction and the second direction to which the logical rotation node points; and
    obtaining an action performance corresponding to the casting preparation process based on the posture performance action and the orientation change action to comprises:
        performing action fusion on the orientation change action on the model rotation node and a posture change action on the model rotation node to obtain rotation data of the model rotation node in the casting preparation process, the rotation data indicating an action performance corresponding to the model rotation node in the casting preparation process.

4. The method according to claim 3, wherein the determining an orientation change action on the model rotation node based on the first direction and the second direction to which the logical rotation node points comprises:
    determining a rotation curve according to a difference between the first direction and the second direction; and
    determining the orientation change action on the model rotation node according to a rotation speed change corresponding to the rotation curve, an orientation of the model rotation node after rotating according to the orientation change action being the same as an orientation corresponding to the logical rotation node.

5. The method according to claim 4, wherein the determining a rotation curve according to a difference between the first direction and the second direction comprises:
    acquiring an animation curve;
    acquiring a first angle of the first direction and a second angle of the second direction;

determining a ratio of the second angle to the first angle; and determining the rotation curve based on a product of a tangent value corresponding to the ratio and the animation curve.

6. The method according to claim 4, wherein the determining a rotation curve according to a difference between the first direction and the second direction comprises:

determining a rotation angle according to the first direction and the second direction; and converting the rotation angle through a quaternion curve to obtain the rotation curve.

7. The method according to claim 1, wherein the displaying a casting preparation process of the first virtual object casting the target skill further comprises:

triggering, if the first virtual object satisfies a skill casting requirement, the display of the casting preparation process of the first virtual object casting the target skill.

8. The method according to claim 7, wherein the triggering, if the first virtual object satisfies a skill casting requirement, the display of the casting preparation process of the first virtual object casting the target skill comprises:

when the first virtual object comprises a virtual attribute value, triggering the display of the casting preparation process of the first virtual object casting the target skill if the virtual attribute value of the first virtual object reaches an attribute threshold; or triggering the display of the casting preparation process of the first virtual object casting the target skill if a distance between the first virtual object and the second virtual object is within a distance requirement range; or triggering the display of the casting preparation process of the first virtual object casting the target skill if a skill casting interval of the first virtual object reaches a length of duration.

9. The method according to claim 1, wherein the virtual environment comprises virtual participant objects that attack the first virtual object, and the virtual participant objects comprise the second virtual object; and before the displaying a casting preparation process of the first virtual object casting the target skill, the method further comprises:

determining an opposition value between each of the virtual participant objects and the first virtual object, the opposition value being determined based on an attack situation of each of the virtual participant objects on the first virtual object; and determining the second virtual object from the virtual participant objects based on the opposition value.

10. The method according to claim 9, wherein the determining the second virtual object from the virtual participant objects based on the opposition value comprises:

determining a virtual participant object with a highest opposition value from the virtual participant objects as the second virtual object.

11. The method according to claim 9, wherein the opposition value is determined according to a number of attacks from each of the virtual participant objects on the first virtual object; or the opposition value is determined according to a damage value generated when each of the virtual participant objects attacks the first virtual object; or the opposition value is determined according to a skill type used by each of the virtual participant objects attacking the first virtual object.

12. The method according to claim 1, wherein the displaying a first virtual object comprises:

displaying the first virtual object in the virtual environment when the second virtual object satisfies a trigger condition, the trigger condition comprising at least one of a task selection condition, an object order display condition, and a position condition;

the task selection condition indicating that a task selected by the second virtual object corresponds to the first virtual object;

the object order display condition indicating that the virtual environment comprises n first virtual objects, and when a $k^{th}$ first virtual object is displayed, the second virtual object completes virtual battles with previous (k−1) first virtual objects, n being a positive integer, and $1 < k \leq n$; and the position condition indicating that the second virtual object is located within a position range corresponding to the first virtual object.

13. A terminal, comprising a processor and a memory, the memory storing at least one instruction, at least one program, a code set, or an instruction set, the at least one instruction, the at least one program, the code set, or the instruction set being loaded and executed by the processor to implement:

displaying a first virtual object in a virtual environment, the virtual environment further comprising a second virtual object, the first virtual object facing a first direction, and the second virtual object being located at a second direction of the first virtual object;

displaying a casting preparation process of the first virtual object casting a target skill when the target skill is triggered on the first virtual object, wherein the casting preparation process comprises an orientation change process and comprises n preparation stages, n being an integer the orientation change process comprising an orientation change of the first virtual object with the first direction as an initial orientation and the second direction as a target orientation; and controlling the first virtual object to cast the target skill toward the second direction when the casting preparation process ends, wherein displaying the casting preparation process of the first virtual object casting the target skill comprises:

determining the second direction based on a position change of the second virtual object in the virtual environment, comprising:

determining a target position of the second virtual object at an end moment of a $k^{th}$ preparation stage, $1 < k < n$, and k being an integer; and determining the second direction corresponding to the orientation change process in a $(k+1)^{th}$ preparation stage based on the target position, a second direction of a first preparation stage being based on a position of the second virtual object at a start moment of the first preparation stage; and determining an orientation change action corresponding to the orientation change process based on the first direction and the second direction.

14. The terminal according to claim 13, wherein the casting preparation process comprises a posture change process, the posture change process comprising a posture performance change of the first virtual object, and the displaying the casting preparation process of the first virtual object casting the target skill comprises:

determining a posture performance action corresponding to the posture change process according to the target skill;

obtaining an action performance corresponding to the casting preparation process based on the posture performance action and the orientation change action; and displaying the action performance through the first virtual object to display the casting preparation process.

15. The terminal according to claim 14, wherein the first virtual object comprises a logical rotation node and a model rotation node;

the determining the orientation change action based on the first direction and the second direction comprises:

switching the logical rotation node to point to the second direction, the logical rotation node indicating an orientation change result of the first virtual object in a server; and determining an orientation change action on the model rotation node based on the first direction and the second direction to which the logical rotation node points; and obtaining an action performance corresponding to the casting preparation process based on the posture performance action and the orientation change action to comprises:

performing action fusion on the orientation change action on the model rotation node and a posture change action on the model rotation node to obtain rotation data of the model rotation node in the casting preparation process, the rotation data indicating an action performance corresponding to the model rotation node in the casting preparation process.

16. A non-transitory computer-readable storage medium, storing at least one program code, the at least one program code being loaded and executed by a processor to implement:

displaying a first virtual object in a virtual environment, the virtual environment further comprising a second virtual object, the first virtual object facing a first direction, and the second virtual object being located at a second direction of the first virtual object;

displaying a casting preparation process of the first virtual object casting a target skill when the target skill is triggered on the first virtual object, wherein the casting preparation process comprises an orientation change process and comprises n preparation stages, n being an integer the orientation change process comprising an orientation change of the first virtual object with the first direction as an initial orientation and the second direction as a target orientation; and controlling the first virtual object to cast the target skill toward the second direction when the casting preparation process ends, wherein displaying the casting preparation process of the first virtual object casting the target skill comprises:

determining the second direction based on a position change of the second virtual object in the virtual environment, comprising:

determining a target position of the second virtual object at an end moment of a $k^{th}$ preparation stage, $1<k<n$, and k being an integer; and determining the second direction corresponding to the orientation change process in a $(k+1)^{th}$ preparation stage based on the target position, a second direction of a first preparation stage being based on a position of the second virtual object at a start moment of the first preparation stage; and determining an orientation change action corresponding to the orientation change process based on the first direction and the second direction.

* * * * *